US012666045B2

(12) United States Patent
Ray et al.

(10) Patent No.: US 12,666,045 B2
(45) Date of Patent: Jun. 23, 2026

(54) INTRA-BLOCK COPY FOR NATURAL VIDEO CONTENT

(71) Applicant: QUALCOMM Incorporated, San Diego, CA (US)

(72) Inventors: Bappaditya Ray, San Diego, CA (US); Hongtao Wang, San Diego, CA (US); Vadim Seregin, San Diego, CA (US); Marta Karczewicz, San Diego, CA (US); Chun-Chi Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 74 days.

(21) Appl. No.: 18/402,397

(22) Filed: Jan. 2, 2024

(65) Prior Publication Data

US 2024/0223777 A1 Jul. 4, 2024

Related U.S. Application Data

(60) Provisional application No. 63/488,396, filed on Mar. 3, 2023, provisional application No. 63/478,335, filed on Jan. 3, 2023.

(51) Int. Cl.
*H04N 19/159* (2014.01)
*H04N 19/176* (2014.01)
*H04N 19/70* (2014.01)

(52) U.S. Cl.
CPC ......... *H04N 19/159* (2014.11); *H04N 19/176* (2014.11); *H04N 19/70* (2014.11)

(58) Field of Classification Search
CPC .... H04N 19/159; H04N 19/176; H04N 19/70; H04N 19/174; H04N 19/593
See application file for complete search history.

(56) References Cited

U.S. PATENT DOCUMENTS

| | | | |
|---|---|---|---|
| 2015/0139296 A1* | 5/2015 | Yu ........................ | H04N 19/103 375/240.02 |
| 2021/0227257 A1* | 7/2021 | Kim ...................... | H04N 19/51 |

OTHER PUBLICATIONS

Bross B., et al., "Versatile Video Coding (Draft 10)," Joint Video Experts Team (JVET) of ITU-T SG 16 WP 3 and ISO/IEC JTC 1/SC 29/WG 11, 131, MPEG Meeting, 19th Meeting, by Teleconference, Jun. 22-Jul. 1, 2020, Jun. 2020-Jul. 3, 2020, Online, (Motion Picture Expert Group or ISO/IEC JTC1/SC29/WG11), No. JVET-S2001-vH, Version 17, Sep. 4, 2020, XP030293002, 548 Pages.

(Continued)

*Primary Examiner* — Richard T Torrente
(74) *Attorney, Agent, or Firm* — Shumaker & Sieffert, P.A.

(57) ABSTRACT

A device for decoding video data can be configured to receive a first syntax element in a syntax structure set to a first value indicating that an intra block copy mode is enabled for slices corresponding to the syntax structure; receive a second syntax element in the syntax structure set to a first value indicating that the intra block copy mode is enabled for non-intra slices corresponding to the syntax structure; and in response to the second syntax element being set to the first value for the second syntax element and in response to a slice type for a block of video data being a non-intra slice, receive a third syntax element for the block of video data set to a first value indicating that the intra block copy mode is enabled for the block of video data.

23 Claims, 10 Drawing Sheets

(56) References Cited

OTHER PUBLICATIONS

Chen C.C., et al., "EE2-1.8/1.9: IBC Adaptation for Coding of Natural Content," JVET-AD0208-v2, Joint Video Experts Team (JVET) of ITU-T SG 16 WP 3 and ISO/IEC Jtc 1/SC 29 30th Meeting, Antalya, Apr. 21-28, 2023, pp. 1-4.

Chen W., et al., "Non-EE2: IBC With Fractional Block Vectors," JVET-AC0172-v3, Joint Video Experts Team (JVET) of ITU-T SG 16 WP 3 and ISO/IEC JTC 1/SC 29 29th Meeting, by Teleconference, Jan. 11-20, 2023, pp. 1-3.

Coban M., et al., "Algorithm Description of Enhanced Compression Model 7 (ECM 7)," JVET-AB2025, m61505, Joint Video Experts Team (JVET) of ITU-T SG 16 WP 3 and ISO/IEC JTC 1/SC 29, 28th Meeting, Mainz, DE, Oct. 20, 2022-Oct. 28, 2022, 62 Pages, Dec. 22, 2022, XP030306363, paragraphs 3.1.5.1, 3.3.5, 03.4, paragraphs [3.1.14], 3.2.16-0020, p. 42, paragraph 3.2.31, Figure 14, Paragraphs [3.1.7], [3.2.3] - [3.2.33], Figures 16, 35.

Coban M., et al., "Algorithm Description of Enhanced Compression Model 8 (ECM 8)," JVET-AC2025, Joint Video Experts Team (JVET) of ITU-T SG 16 WP 3 and ISO/IEC JTC 1/SC 29, 29th Meeting, by teleconference, Jan. 11-20, 2023, pp. 1-74.

ITU-T H.265: "Series H: Audiovisual and Multimedia Systems Infrastructure of Audiovisual Services—Coding of Moving Video," High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video," Versatile Video Coding, The International Telecommunication Union, Aug. 2020, 516 pages.

Jhu H-J., et al., (Kwai): "EE2-2.5: Filtered Intra Block Copy (FIBC)," Joint Video Experts Team (JVET) of ITU-T SG 16 WP 3 and ISO/IEC JTC 1/SC 29, JVET-AE0159-v3, 31st Meeting, Geneva, Jul. 11, 2023-Jul. 19, 2023, No. JVET-AE0159, Jul. 12, 2023, 5 Pages, XP030311467, The Whole Document.

Jhu H.J., et al., "Non-EE2: Filtered Intra Block Copy (FIBC)," JVET-AD0217-v2, Joint Video Experts Team (JVET) of ITU-T SG 16 WP 3 and ISO/IEC JTC 1/SC 29 30th Meeting, Antalya, TR, Apr. 21-28, 2023, pp. 1-3.

Karczewicz M., et al., "Common Test Conditions and Evaluation Procedures for Enhanced Compression Tool Testing," JVET-Y2017-v1, Joint Video Experts Team (JVET) of ITU-T SG 16 WP 3 and ISO/IEC JTC 1/SC 29, 25th Meeting, by teleconference, Jan. 12-21, 2022, pp. 1-12.

Ray B., et al., "Non-EE2: IBC Adaptation for Coding of Natural Content," JVET-AC0161-v4, Joint Video Experts Team (JVET) of ITU-T SG 16 WP 3 and ISO/IEC JTC 1/SC 29 29th Meeting, by teleconference, Jan. 11-20, 2023, pp. 1-4.

Ray B., et al., (Qualcomm): "Non-EE2: Filtering for IBC Predicted Block," Joint Video Experts Team (JVET) of ITU-T SG 16 WP 3 and ISO/IEC JTC 1/SC 29, JVET-AD0223-v2, 30th Meeting, Antalya, Apr. 21, 2023-Apr. 28, 2023, No. JVET-AD0223, m62908, Apr. 22, 2023, 4 Pages, XP030309020, The Whole Document.

Seregin V., et al., "Exploration Experiment on Enhanced Compression Beyond VVC Capability (EE2)," Joint Video Experts Team (JVET) of ITU-T SG 16 WP 3 and ISO/IEC JTC 1/SC 29, JVET-AC2024-v2, 29th Meeting, by teleconference, Jan. 11-20, 2023, pp. 1-30.

Xu J., et al., "EE2-1.7: IBC Adaptation for Camera-Captured Content," JVET-AA0106-v3, Joint Video Experts Team (JVET) of ITU-T SG 16 WP 3 and ISO/IEC JTC 1/SC 29 27th Meeting, by teleconference, Jul. 13-22, 2022, pp. 1-4.

Chen C-C (Qualcomm)., et al., "AHG6: ECM Software Configuration Parameters for Template Matching Tools", 27. JVET Meeting, Jul. 13, 2022-Jul. 22, 2022, Teleconference, (The Joint Video Exploration Team of ISO/IEC JTC1/SC29/ WG11 and ITU-T SG. 16), No. JVET-AA0132-v3, m60108, Jul. 19, 2022, 6 Pages, XP030302987, Slides 2-3.

Flynn D., et al., "High Efficiency Video Coding (HEVC) Range Extensions Text Specification: Draft 4", 14. JCT-VC Meeting, Jul. 25, 2013-Feb. 8, 2013, Vienna, (Joint Collaborative Team on Video Coding of ISO/IEC JTC1/SC29/WG11 and ITU-T SG. 16), No. JCTVC-N1005-v3 ,Aug. 8, 2013, 322 pp. XP030114950, abstract, p. 33-p. 34, p. 90, Sections 7.4.9.9 and 8.4.4.2.7.

International Search Report and Written Opinion—PCT/US2024/010167—ISA/EPO—Apr. 29, 2024.

Pang C (Qualcomm)., et al., "AhG5: Constrained Intra Prediction for Intra Block Copying", 15. JCT-VC Meeting, Oct. 23, 2013-Nov. 1, 2013, Geneva, (Joint Collaborative Team on Video Coding of ISO/IEC JTC1/SC29/WG11 and ITU-T SG.16), No. JCTVC-O0155-v3, Oct. 24, 2013, pp. 1-7, XP030238638, abstract, Sections 1, 2.2 and 5.1.

* cited by examiner

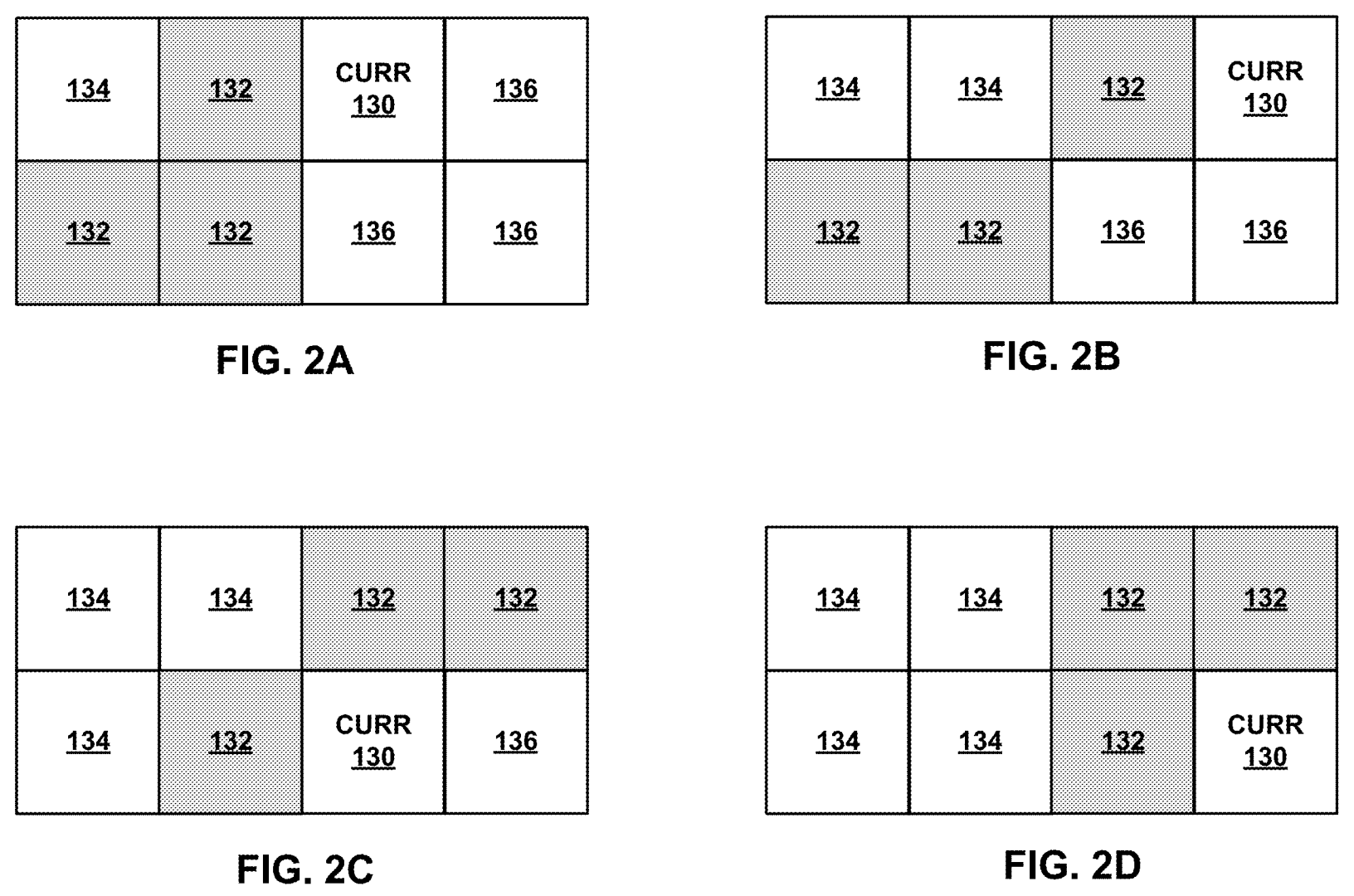

| 134 | 132 | CURR 130 |
|-----|-----|----------|
| 132 | 132 | 136 |
|     | 134 | 136 |

FIG. 2B

| 134 | 132 | 132 |
|-----|-----|-----|
| 134 | 132 | CURR 130 |
| 134 | 134 | |

FIG. 2D

| 134 | 132 | 136 |
|-----|-----|-----|
| 132 | CURR 130 | 136 |
|     | 132 | 136 |

FIG. 2A

| 134 | 132 | 132 |
|-----|-----|-----|
| 134 | CURR 130 | 136 |
| 134 | 132 | |

| | | |
|---|---|---|
| | | |
| | | |
| m+1, n-2 142 | m+1, n-1 142 | |
| m, n-2 142 | m, n-1 142 | m, n 140 |
| m-1, n-2 142 | m-1, n-1 142 | m-1, n 142 |
| m-2, n-2 142 | m-2, n-1 142 | m-2, n 142 |
| | | |
| | | |

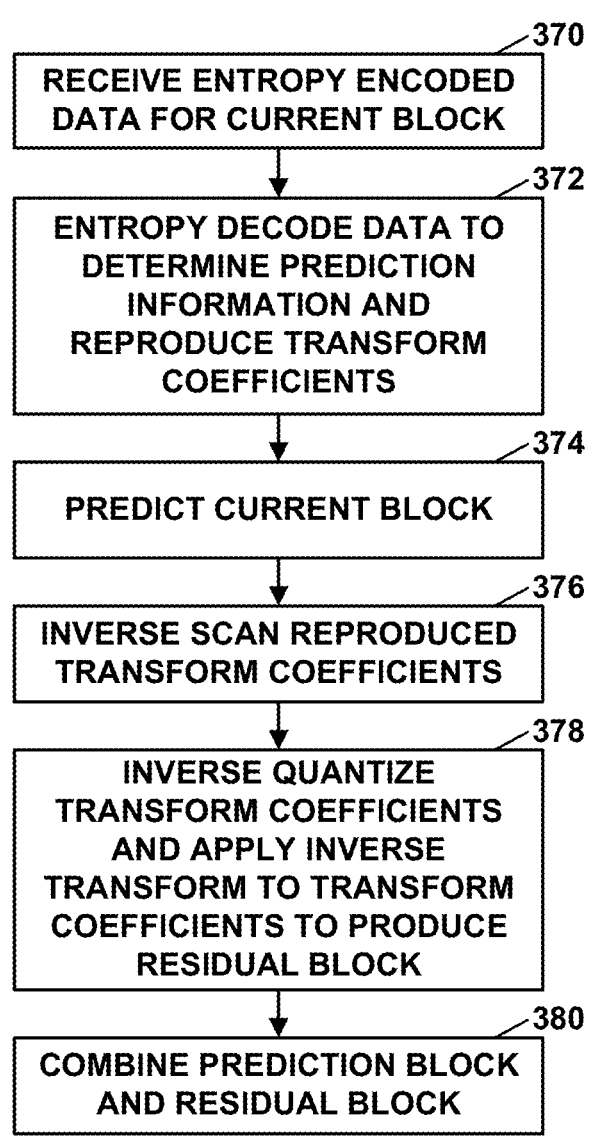

370

RECEIVE ENTROPY ENCODED
DATA FOR CURRENT BLOCK

372

ENTROPY DECODE DATA TO
DETERMINE PREDICTION
INFORMATION AND
REPRODUCE TRANSFORM
COEFFICIENTS

374

PREDICT CURRENT BLOCK

376

INVERSE SCAN REPRODUCED
TRANSFORM COEFFICIENTS

378

INVERSE QUANTIZE
TRANSFORM COEFFICIENTS
AND APPLY INVERSE
TRANSFORM TO TRANSFORM
COEFFICIENTS TO PRODUCE
RESIDUAL BLOCK

380

COMBINE PREDICTION BLOCK
AND RESIDUAL BLOCK

FIG. 8

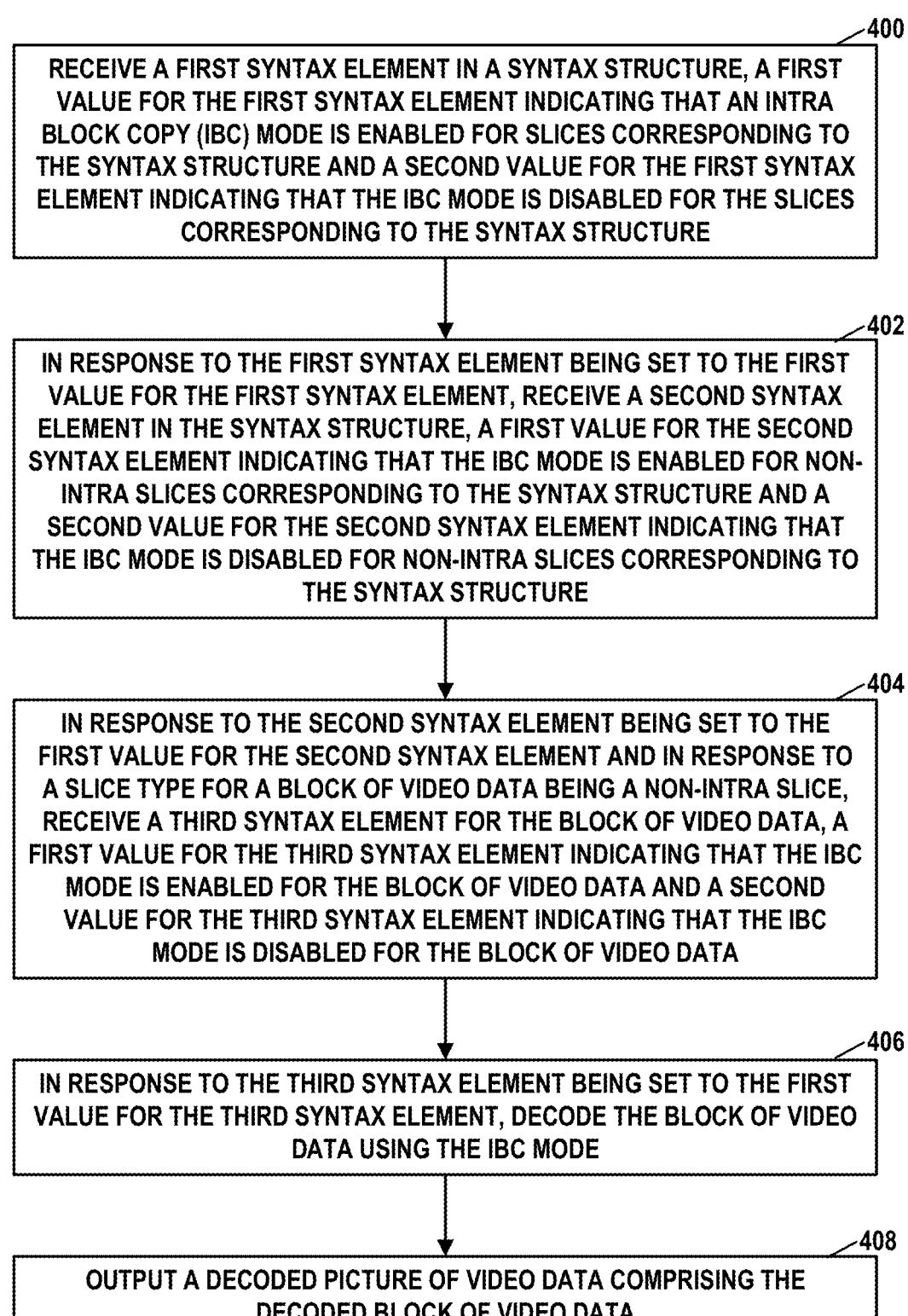

400

RECEIVE A FIRST SYNTAX ELEMENT IN A SYNTAX STRUCTURE, A FIRST VALUE FOR THE FIRST SYNTAX ELEMENT INDICATING THAT AN INTRA BLOCK COPY (IBC) MODE IS ENABLED FOR SLICES CORRESPONDING TO THE SYNTAX STRUCTURE AND A SECOND VALUE FOR THE FIRST SYNTAX ELEMENT INDICATING THAT THE IBC MODE IS DISABLED FOR THE SLICES CORRESPONDING TO THE SYNTAX STRUCTURE

402

IN RESPONSE TO THE FIRST SYNTAX ELEMENT BEING SET TO THE FIRST VALUE FOR THE FIRST SYNTAX ELEMENT, RECEIVE A SECOND SYNTAX ELEMENT IN THE SYNTAX STRUCTURE, A FIRST VALUE FOR THE SECOND SYNTAX ELEMENT INDICATING THAT THE IBC MODE IS ENABLED FOR NON-INTRA SLICES CORRESPONDING TO THE SYNTAX STRUCTURE AND A SECOND VALUE FOR THE SECOND SYNTAX ELEMENT INDICATING THAT THE IBC MODE IS DISABLED FOR NON-INTRA SLICES CORRESPONDING TO THE SYNTAX STRUCTURE

404

IN RESPONSE TO THE SECOND SYNTAX ELEMENT BEING SET TO THE FIRST VALUE FOR THE SECOND SYNTAX ELEMENT AND IN RESPONSE TO A SLICE TYPE FOR A BLOCK OF VIDEO DATA BEING A NON-INTRA SLICE, RECEIVE A THIRD SYNTAX ELEMENT FOR THE BLOCK OF VIDEO DATA, A FIRST VALUE FOR THE THIRD SYNTAX ELEMENT INDICATING THAT THE IBC MODE IS ENABLED FOR THE BLOCK OF VIDEO DATA AND A SECOND VALUE FOR THE THIRD SYNTAX ELEMENT INDICATING THAT THE IBC MODE IS DISABLED FOR THE BLOCK OF VIDEO DATA

406

IN RESPONSE TO THE THIRD SYNTAX ELEMENT BEING SET TO THE FIRST VALUE FOR THE THIRD SYNTAX ELEMENT, DECODE THE BLOCK OF VIDEO DATA USING THE IBC MODE

408

OUTPUT A DECODED PICTURE OF VIDEO DATA COMPRISING THE DECODED BLOCK OF VIDEO DATA

FIG.9

INTRA-BLOCK COPY FOR NATURAL VIDEO CONTENT

This application claims the benefit of:

U.S. Provisional Patent Application 63/478,335, filed 3 Jan. 2023, and

U.S. Provisional Patent Application 63/488,396, filed 3 Mar. 2023, the entire content of both being incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

The techniques of this disclosure relate to intra block copy (IBC) and, more specifically, relate to techniques for performing IBC and signaling IBC that may be of particular benefit when used in conjunction with natural video content, as opposed to, for example, screen content. Screen content, e.g., computer generated content, often has lots of repetitive blocks of samples. For example, in screen content, shapes, background colors and patterns, letters, numbers, and the like often have multiple occurrences of identical blocks of pixels within a picture. In contrast, natural video content, such as video recorded by a camera, tends to have very few identical blocks of pixels within a picture. In natural video content, even generally similar blocks tend to not be identical due to differences in shading, illumination, and other such effects. Accordingly, IBC is generally considered to be a coding tool that works best when used on screen content, but nevertheless there are still some coding scenarios where IBC may produce coding gains when used with natural content.

As one specific examples, for natural video content, inter prediction generally provides equal or better prediction than IBC. Therefore, the signaling overhead and increased complexity of IBC often does not produce coding gains for non-intra frames of natural video content. For intra frames of natural video content, however, inter prediction is not available, and intra prediction modes usually provide less compression than inter prediction modes. Therefore, for natural video content, it may be beneficial to enable IBC for intra slices and disable IBC for non-intra slices.

By receiving a syntax element with a first value for the syntax element indicating that the intra block copy mode is enabled for non-intra slices corresponding to a syntax structure and a second value for the syntax element indicating that the intra block copy mode is disabled for non-intra slices corresponding to the syntax structure, a video decoder configured according to the techniques of this disclosure may be able to obtain improved rate-distortion tradeoff by better enabling and disabling IBC for natural content and screen content.

According to an example of this disclosure, a method of decoding video data includes receiving a first syntax element in a syntax structure, wherein a first value for the first syntax element indicates that an intra block copy mode is enabled for slices corresponding to the syntax structure and a second value for the first syntax element indicates that the intra block copy mode is disabled for the slices corresponding to the syntax structure; in response to the first syntax element being set to the first value for the first syntax element, receiving a second syntax element in the syntax structure, wherein a first value for the second syntax element indicates that the intra block copy mode is enabled for non-intra slices corresponding to the syntax structure and a second value for the second syntax element indicates that the intra block copy mode is disabled for non-intra slices corresponding to the syntax structure; in response to the second syntax element being set to the first value for the second syntax element and in response to a slice type for a block of video data being a non-intra slice, receiving a third syntax element for the block of video data, wherein a first value for the third syntax element indicates that the intra block copy mode is enabled for the block of video data and a second value for the third syntax element indicates that the intra block copy mode is disabled for the block of video data; in response to the third syntax element being set to the first value for the third syntax element, decoding the block of video data using the intra block copy mode; outputting a decoded picture of video data comprising the decoded block of video data.

According to an example of this disclosure, a device for decoding video data includes a memory configured to store video data; one or more processors implemented in circuitry and configured to: receive a first syntax element in a syntax structure, wherein a first value for the first syntax element indicates that an intra block copy mode is enabled for slices corresponding to the syntax structure and a second value for the first syntax element indicates that the intra block copy mode is disabled for the slices corresponding to the syntax structure; in response to the first syntax element being set to the first value for the first syntax element, receive a second syntax element in the syntax structure, wherein a first value for the second syntax element indicates that the intra block copy mode is enabled for non-intra slices corresponding to the syntax structure and a second value for the second syntax element indicates that the intra block copy mode is disabled for non-intra slices corresponding to the syntax structure; in response to the second syntax element being set to the first value for the second syntax element and in response to a slice type for a block of video data being a non-intra slice, receive a third syntax element for the block of video data, wherein a first value for the third syntax element indicates that the intra block copy mode is enabled for the block of video data and a second value for the third syntax element indicates that the intra block copy mode is disabled for the block of video data; in response to the third syntax element being set to the first value for the third syntax element, decode the block of video data using the intra block copy mode; output a decoded picture of video data comprising the decoded block of video data.

A computer-readable storage medium stores instructions that when executed by one or more processors cause the one or more processors to: receive a first syntax element in a syntax structure, wherein a first value for the first syntax element indicates that an intra block copy mode is enabled for slices corresponding to the syntax structure and a second value for the first syntax element indicates that the intra block copy mode is disabled for the slices corresponding to the syntax structure; in response to the first syntax element being set to the first value for the first syntax element, receive a second syntax element in the syntax structure, wherein a first value for the second syntax element indicates that the intra block copy mode is enabled for non-intra slices corresponding to the syntax structure and a second value for the second syntax element indicates that the intra block copy mode is disabled for non-intra slices corresponding to the syntax structure; in response to the second syntax element being set to the first value for the second syntax element and in response to a slice type for a block of video data being a non-intra slice, receive a third syntax element for the block of video data, wherein a first value for the third syntax element indicates that the intra block copy mode is enabled for the block of video data and a second value for the third syntax element indicates that the intra block copy mode is disabled for the block of video data; in response to the third syntax element being set to the first value for the third syntax element, decode the block of video data using the intra block copy mode; output a decoded picture of video data comprising the decoded block of video data.

The details of one or more examples are set forth in the accompanying drawings and the description below. Other features, objects, and advantages will be apparent from the description, drawings, and claims.

BRIEF DESCRIPTION OF DRAWINGS

FIGS. 2A-2D illustrate reference regions for intra block copy (IBC) mode.

FIG. 3 illustrates an example of a reference area for coding a coding tree unit.

FIG. 8 is a flowchart illustrating an example process for decoding a current block in accordance with the techniques of this disclosure.

FIG. 9 is a flowchart illustrating an example process for decoding a current block in accordance with the techniques of this disclosure.

DETAILED DESCRIPTION

Figure 1:
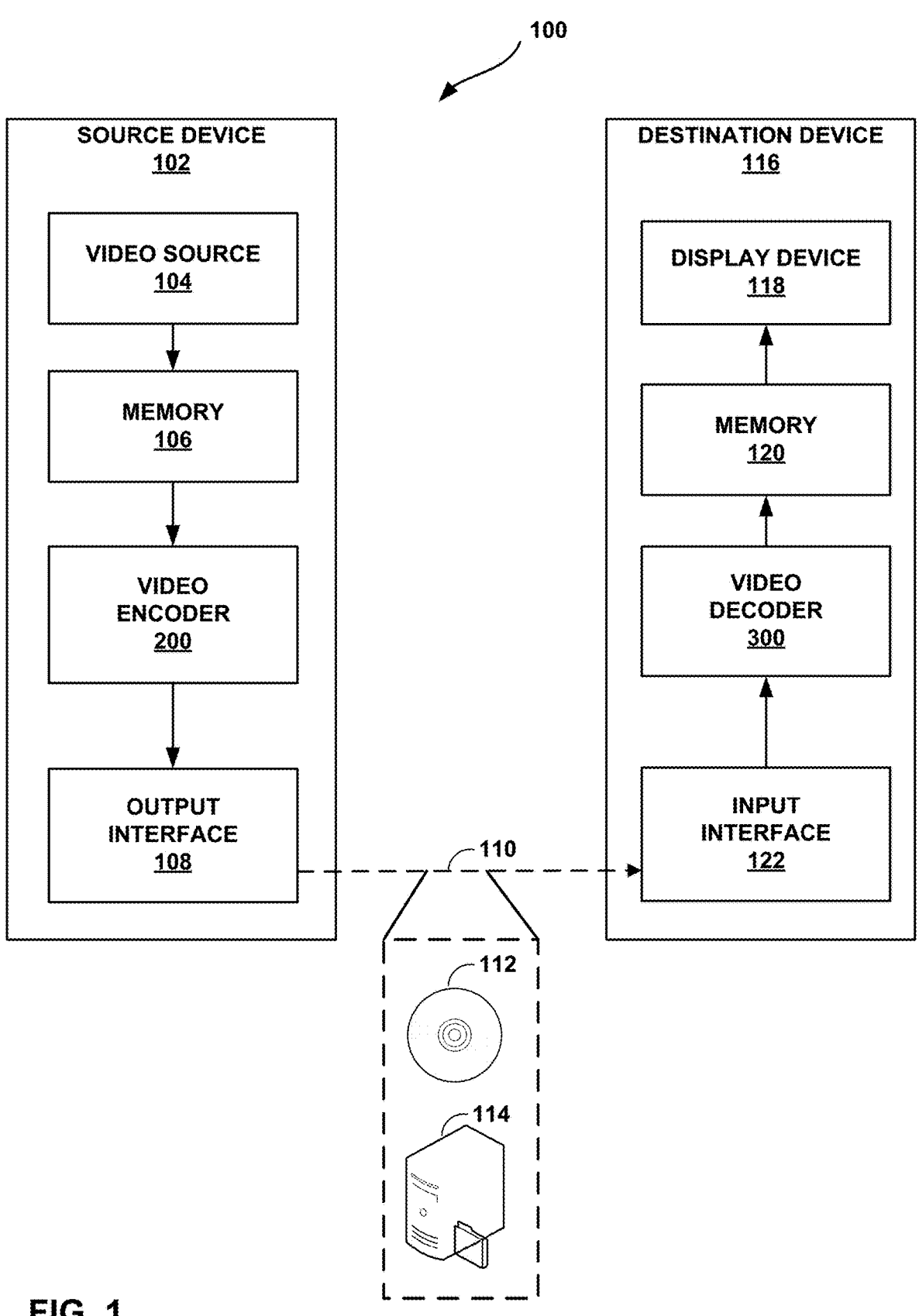
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction or intra block copy (IBC)) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

The techniques of this disclosure relate to IBC and, more specifically, relate to techniques for performing IBC and signaling IBC that may be of particular benefit when used in conjunction with natural video content, as opposed to, for example, screen content. Screen content, e.g., computer generated content, often has lots of repetitive blocks of samples. For example, in screen content, shapes, background colors and patterns, letters, numbers, and the like often have multiple occurrences of identical blocks of pixels within a picture. In contrast, natural video content, such as video recorded by a camera, tends to have very few identical blocks of pixels within a picture. In natural video content, even generally similar blocks tend to not be identical due to differences in shading, illumination, and other such effects. Accordingly, IBC is generally considered to be a coding tool that works best when used on screen content, but nevertheless there are still some coding scenarios where IBC may produce coding gains when used with natural content.

As one specific examples, for natural video content, the usage of inter prediction mode is typically more common than IBC because natural content tends to be repetitive from picture to picture, thus most blocks can be predicted from a temporal reference picture. Therefore, the signaling overhead and increased complexity of IBC often does not produce coding gains for non-intra frames of natural video content. For intra frames of natural video content, however, inter prediction is not available, and intra prediction modes may not predict repetitive blocks efficiently. Therefore, intra prediction often provides less compression efficiency than IBC modes. Therefore, for natural video content, it may be beneficial to enable IBC for intra slices and disable IBC for non-intra slices.

By receiving a syntax element with a first value for the syntax element indicating that the intra block copy mode is enabled for non-intra slices corresponding to a syntax structure and a second value for the syntax element indicating that the intra block copy mode is disabled for non-intra slices corresponding to the syntax structure, a video decoder configured according to the techniques of this disclosure may be able to obtain improved rate-distortion tradeoff by better enabling and disabling IBC for natural content and screen content.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for intra block copy described herein. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform the techniques for intra block copy described herein. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). JVET has started exploring technologies to further improve the coding performance of VVC. A test model reference software is also in development and described in J. Chen, Y. Ye, S. Kim, "Algorithm description of Enhanced Compression Model 7 (ECM 7)," 28th JVET Meeting, Mainz, DE, October 2022, JVET-AB2025. In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use intra block copy.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUS having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

VVC includes an IBC mode. IBC significantly improves the coding efficiency of screen content materials. IBC mode is implemented as a block level coding mode, and thus block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector rounds to integer precision as well. When combined with AMVR, the IBC mode can switch between 1-pel and 4-pel motion vector precisions. An IBC-coded CU is treated as a third prediction mode that is different than intra or inter prediction modes. In VVC, the IBC mode is used for CUs with both width and height smaller than or equal to 64 luma samples. Multi-transform selection (MTS) and low-frequency, non-separable transform (LFNST) are disabled for an IBC coded block.

At a CU level, IBC mode may be signaled with a flag and can be signaled as IBC AMVP mode or IBC skip/merge mode. In IBC skip/merge mode, a merge candidate index is used to indicate which of the block vectors in a list of neighboring candidate IBC coded blocks is used to predict the current block. The merge list includes spatial, history-based motion vector predictor, and pairwise candidates. In IBC AMVP mode, a block vector difference is coded in the same way as a motion vector difference. The block vector prediction process uses two candidates as predictors, one from a left neighbor and one from an above neighbor (if IBC coded). When either neighbor is not available, a default block vector may be used as a predictor. A flag may be signaled to indicate the block vector predictor index.

To reduce memory consumption and decoder complexity, IBC mode in VVC allows only the reconstructed portion of the predefined area including the region of current CTU and some region of the left CTU.

FIGS. 2A-2D show examples of reference regions for IBC Mode, where each block represents a 64×64 luma sample unit. In the examples of FIGS. 2A-2D, current block 130 represents a block currently being coded. Blocks 132 represent already-coded blocks that are available for predicting block 130 using IBC. Blocks 134 represent already-coded blocks that are not available for predicting block 130. Blocks 136 represent not-yet-coded blocks that are not available for predicting block 130.

Depending on the location of the current coding CU location within the current CTU, different blocks may be available for IBC. If a current block falls into the top-left 64×64 block of the current CTU, as in FIG. 2A, then in addition to the already reconstructed samples in the current CTU, the current CTU may also be predicted using the reference samples in the bottom-right 64×64 blocks of the left CTU, using a current picture referencing (CPR) mode, such as IBC. The current block can also be predicted using the reference samples in the bottom-left 64×64 block of the left CTU and the reference samples in the top-right 64×64 block of the left CTU, using CPR mode.

If a current block falls into the top-right 64×64 block of the current CTU, as in FIG. 2B, then in addition to the already reconstructed samples in the current CTU, if luma location (0, 64) relative to the current CTU has not yet been reconstructed, the current block may also be predicted using the reference samples in the bottom-left 64×64 block and bottom-right 64×64 block of the left CTU, using CPR mode. Otherwise, the current block may be predicted using reference samples in bottom-right 64×64 block of the left CTU.

If a current block falls into the bottom-left 64×64 block of the current CTU, as in FIG. 2C, then in addition to the already reconstructed samples in the current CTU, if luma location (64, 0) relative to the current CTU has not yet been reconstructed, the current block may be predicted using the reference samples in the top-right 64×64 block and bottom-right 64×64 block of the left CTU, using CPR mode. Otherwise, the current block can also be predicted using the reference samples in the bottom-right 64×64 block of the left CTU, using CPR mode. If a current block falls into the bottom-right 64×64 block of the current CTU, as in FIG. 2D, the current block may be predicted using only the already reconstructed samples in the current CTU, using CPR mode.

There are several improvements of the IBC tool in the current ECM relative to VVC, mainly targeting improvement for screen content. For example, ECM includes IBC with template matching (TM-IBC). Template Matching is used in IBC for both IBC merge mode and IBC AMVP mode.

The IBC-TM merge list is modified compared to the one used by regular IBC merge mode such that the candidates are selected according to a pruning process with a motion distance between the candidates as in the regular TM merge mode. The ending zero motion fulfillment is replaced by motion vectors to the left (–W, 0), top (0, –H) and top-left (–W, –H), where W is the width and H the height of the current CU.

In the IBC-TM merge mode, the selected candidates are refined with the Template Matching process prior to the RDO or decoding process. The IBC-TM merge mode has been put in competition with the regular IBC merge mode and a TM-merge flag may be signaled.

In the IBC-TM AMVP mode, up to three candidates are selected from the IBC-TM merge list. Each of those three selected candidates are refined using the Template Matching process and sorted according to their resulting Template Matching cost. Only the 2 first ones are then considered in the motion estimation process as usual.

The Template Matching refinement for both IBC-TM merge and AMVP modes is quite simple since IBC motion vectors are constrained (i) to be integer and (ii) within a reference region as shown in FIGS. 2A-2D. So, in IBC-TM merge mode, all refinements are performed at integer precision, and in IBC-TM AMVP mode, they are performed either at integer or 4-pel precision depending on the AMVR value. Such a refinement accesses only samples without interpolation. In both cases, the refined motion vectors and the used template in each refinement step must respect the constraint of the reference region.

Figure 3:
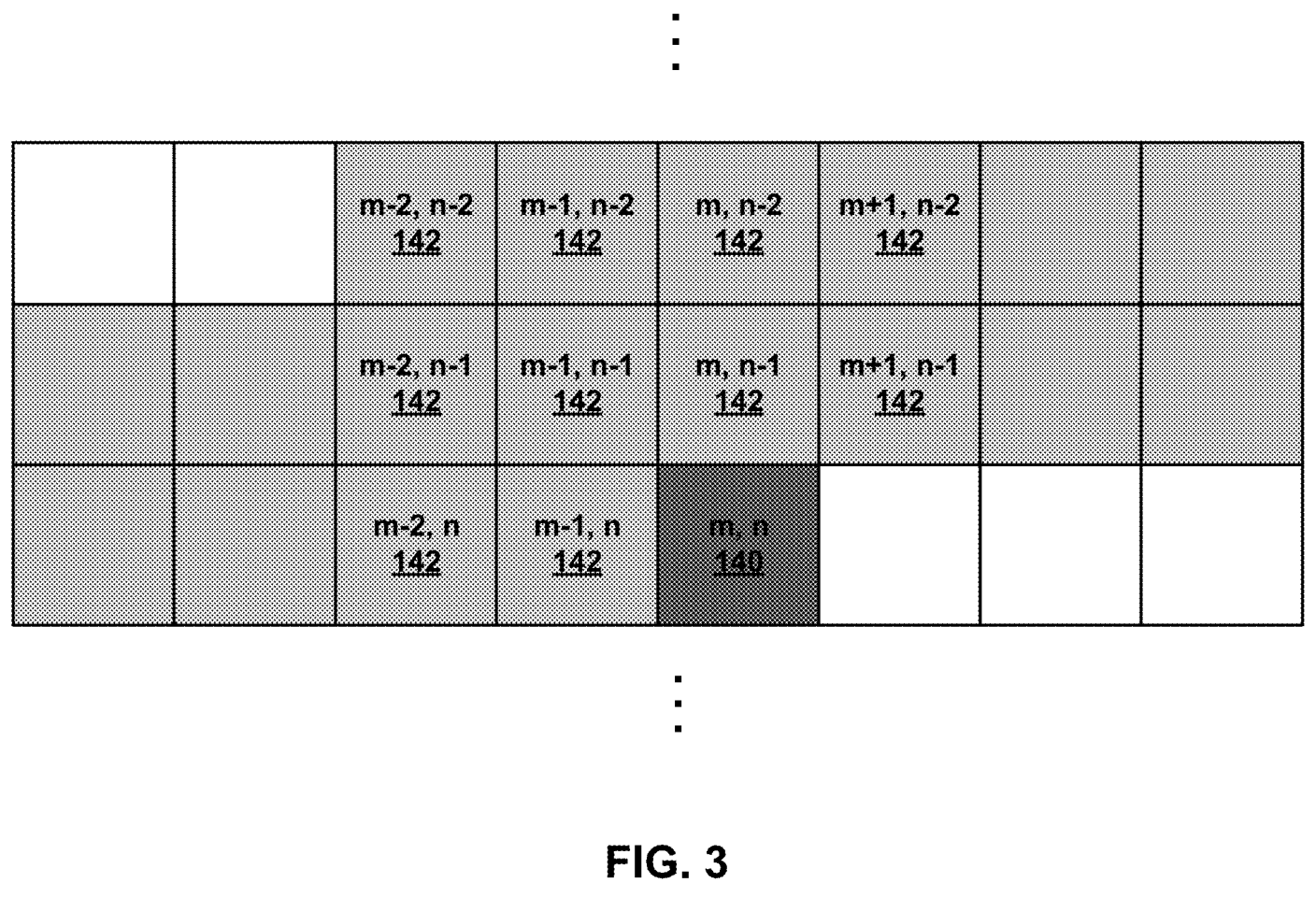

IBC in ECM includes a reference area increase relative to VVC. The reference area for IBC is extended to two CTU rows above. FIG. 3 shows the reference area for coding CTU 140, located at (m, n). Specifically, for CTU 140 to be coded, the reference area includes CTUs 142, with index (m−2, n−2) . . . (W, n−2),(0, n−1) . . . (W, n−1),(0, n) . . . (m, n), where W denotes the maximum horizontal index within the current tile, slice or picture. When a CTU size is 256, the reference area is limited to one CTU row above. This setting ensures that for CTU size being 128 or 256, IBC does not require extra memory in the current ETM platform. The per-sample block vector search (or called local search) range is limited to $[-(C<<1), C>>2]$ horizontally and $[-C, C>>2]$ vertically to adapt to the reference area extension, where C denotes the CTU size.

ECM also includes a reconstruction reordered IBC (RR-IBC). RR-IBC mode is allowed for IBC coded blocks. When RR-IBC is applied, the samples in a reconstruction block are flipped according to a flip type of the current block. At the encoder side, the original block is flipped before motion search and residual calculation, while the prediction block is derived without flipping. At the decoder side, the reconstruction block is flipped back to restore the original block.

Two flip processes, horizontal flip and vertical flip, are supported for RR-IBC coded blocks. A syntax flag is firstly signaled for an IBC AMVP coded block, indicating whether the reconstruction is flipped, and if it is flipped, another flag is further signaled specifying the flip type. For IBC merge, the flip type is inherited from neighboring blocks, without syntax signaling. Considering the horizontal or vertical symmetry, the current block and the reference block are normally aligned horizontally or vertically. Therefore, when a horizontal flip is applied, the vertical component of the BV is not signaled and inferred to be equal to 0. Similarly, the horizontal component of the BV is not signaled and inferred to be equal to 0 when a vertical flip is applied.

Figure 4A:
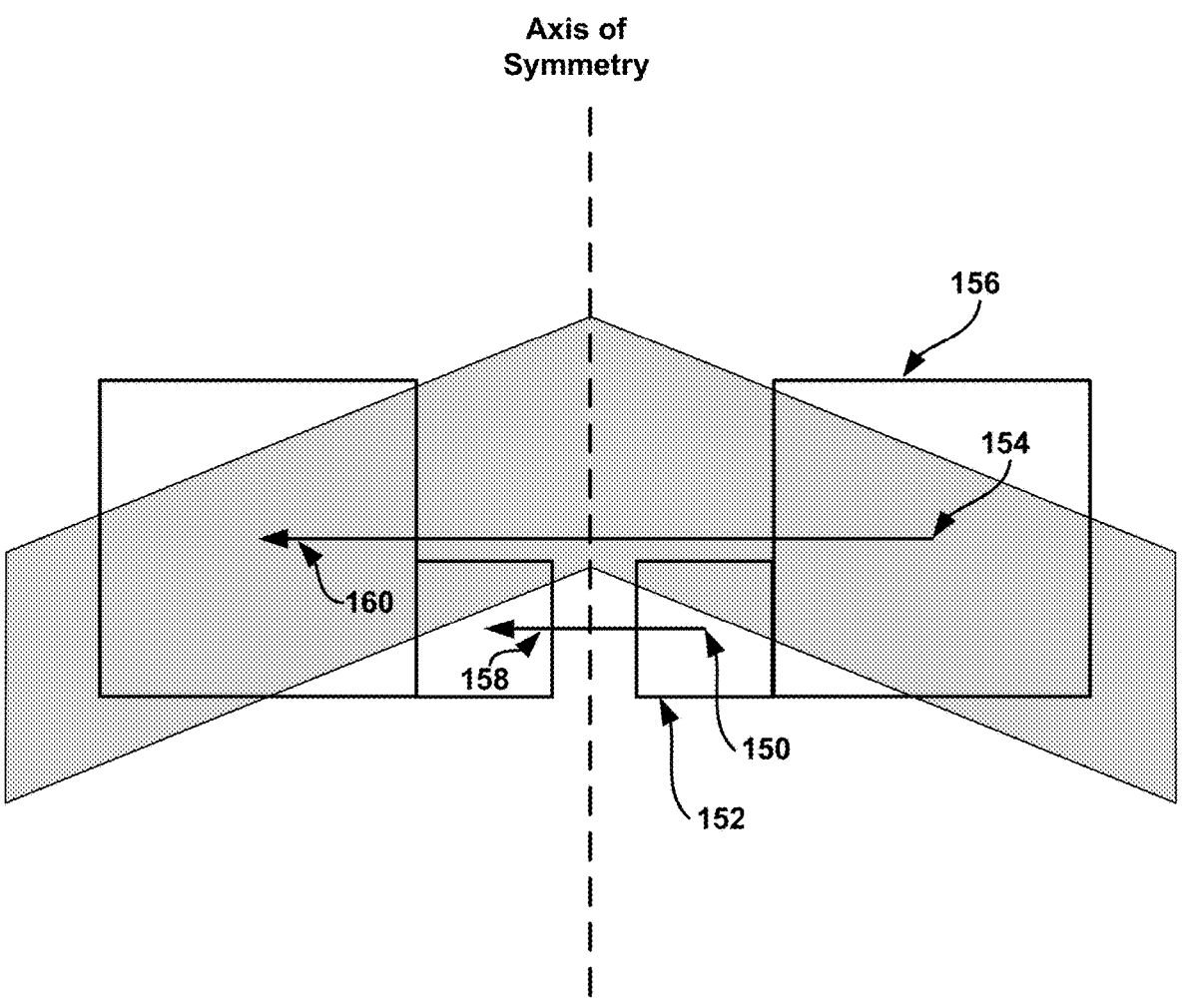
FIGS. 4A and 4B show examples of BV adjustments for a horizontal flip and a vertical flip, respectively.
Figure 4B:
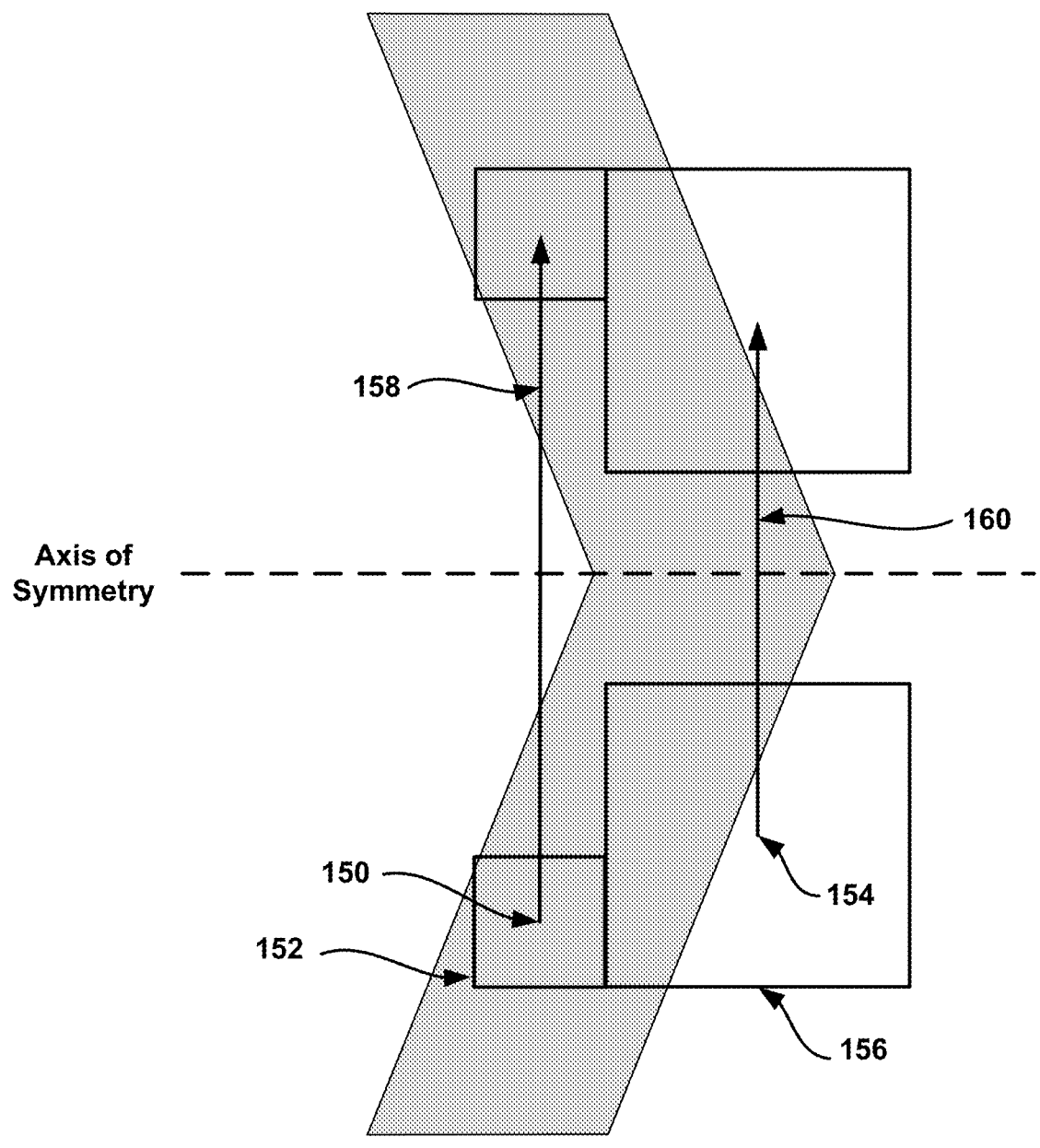

To better utilize the symmetry property, a flip-aware BV adjustment approach is applied to refine the block vector candidate. FIG. 4A shows an example of a horizontal flip, and FIG. 4B shows an example of a vertical flip. In the examples of FIGS. 4A and 4B, $(x_{nbr}, y_{nbr})$ represents the coordinates of the center sample 150 of the neighboring block 152, and $(x_{cur}, y_{cur})$ represents the coordinates of center sample 154 of current block 156. $BV^{nbr}$ denotes BV 158 of neighboring block 152, and $BV^{cur}$ denotes BV 160 of the current block 156, respectively. Instead of directly inheriting BV 158 from neighboring block 152, the horizontal component of $BV^{cur}$ is calculated by adding a motion shift to the horizontal component of $BV^{nbr}$ (denoted as $BV^{nbr}_h$) in case that neighboring block 152 is coded with a horizontal flip, i.e., $BV^{cur}_h = 2(x_{nbr} - x_{cur}) + BV^{nbr}_h$. Similarly, the vertical component of $BV^{cur}$ is calculated by adding a motion shift to the vertical component of $BV^{nbr}$ (denoted as $BV^{nbr}_v$) in case that the neighboring block is coded with a vertical flip, i.e., $BV^{cur}_v = 2(y_{nbr} - y_{cur}) + BV^{nbr}_v$.

It is to be noted that there is no way to deactivate RR-IBC or template matching IBC in a selective manner when IBC is enabled, e.g., when IBC is enabled in an SPS, these tools are automatically enabled.

In J. Chen, Y. Ye, S. Kim, "Algorithm description of Enhanced Compression Model 8 (ECM 8.0)," 29th JVET Meeting, Teleconference, January 2023, JVET-AC2025, a new syntax element for BVD signaling is introduced. Where before any BVD coding, one additional syntax element may be signaled to indicate whether BVD is one-component (BVD has nonzero component in only one direction and zero for other component) or not (e.g., pure horizontal or vertical BVD). This syntax element may be signaled for all IBC modes.

In ECM-8.0, several extensions of IBC such as IBC-GPM (geometry partitioning mode for IBC), IBC-CIIP (CIIP for IBC), IBC-LIC (LIC for IBC) are introduced. These tools may be similar to corresponding inter-counterpart tools, and may mainly be extended to IBC prediction to provide better compression performance.

Existing implementations of IBC may exhibit some problems. For example, In VVC and in ECM, the current IBC tool is mainly designed for screen content coding. However, some adaptation of IBC related tools may be required for the coding of natural content. In this disclosure, multiple examples are described for the application of IBC tools with the focus on coding of natural video content. These examples can either be applied separately or in a combined way.

In one example, if IBC is enabled at an SPS level, then another high-level flag may be signaled to indicate that IBC may be only enabled in intra slices/pictures and disabled in non-intra slices/pictures (i.e., P or B slices). If IBC is enabled for a given slice, only then is an IBC flag signaled per coding block. This technique may be implemented using an SPS level flag indicating whether IBC is enabled for non-intra slices can be signaled when IBC is enabled from the SPS level. In some examples, this technique may be implemented using an IBC enable flag signaled for each slice (for e.g., in slice header) or for each picture (for e.g., in picture header). In some examples, this technique may be implemented using an IBC enable flag signaled per CTU level to provide enhanced granularity.

When implement an SPS level flag indicating whether IBC is enabled for non-intra slices can be signaled when IBC is enabled from the SPS level, the flag may typically, but not always, be true for screen content and false for natural content. It may be desirable to disable IBC for inter slices of natural content because in such coding scenarios, IBC often does not produce coding gains relative to inter mode.

In some examples, an SPS level flag may be signaled indicating whether RR-IBC is enabled when IBC is enabled at the SPS level. In another example, an SPS level flag may be signaled indicating whether IBC with template matching is enabled when IBC is enabled at the SPS level. In some examples, the maximum CU size where IBC can be applied can be signaled in the SPS/Slice/picture level, instead of a fixed maximum size of 64 as in VVC or current ECM.

In some examples, LFNST and MTS can be applied to IBC coded block with an equivalent intra mode information derived from gradient direction of the prediction signal or in a decoder side intra mode derivation (DIMD) fashion.

In some examples, a high-level flag may be signaled to indicate if IBC merge tools are signaled. In this context, merge tools generally refer to coding tools that are signaled conditionally based on merge mode being activated, such as IBC-GPM, IBC-MBVD, etc. If the high level flag indicates IBC merge tools are disabled, the CU/PU level signaling associated with IBC merge tools are disabled. The high-level flag may be at the SPS level. In that case, all the picture/frames associated with the SPS may follow the same normative modification. In some examples, the flag may also be at the slice/picture level or even at a CTU level to provide further granularity.

In some examples, either all or some merge tools may be disabled for certain block sizes/shapes, e.g., there may be no signaling only for those specific block sizes/shapes.

In some examples, the high-level syntax solely related with IBC merge, such as signaling of a number of IBC merge candidates, SPS signaling of IBC-GPM, SPS-signaling of IBC-MBVD (merge with block vector differences, similar to MMVD for regular inter prediction) may be avoided and inferred to be 0 or disabled when IBC-merge is disabled. For example, the signaling of such syntax element may be made conditional to the value of IBC-merge flag. Thus, in some instances, only when the IBC-merge flag is enabled are these syntax elements signaled.

In some examples, the one-component BVD may only be signaled for RR-IBC blocks, as one-component signaling may be useful for RR-IBC blocks. So, for non RR-IBC modes, this syntax is not signaled. Additionally or alternatively, there may be a SPS or high level flag to disallow one-component signaling for non RR-IBC modes.

Figure 5:
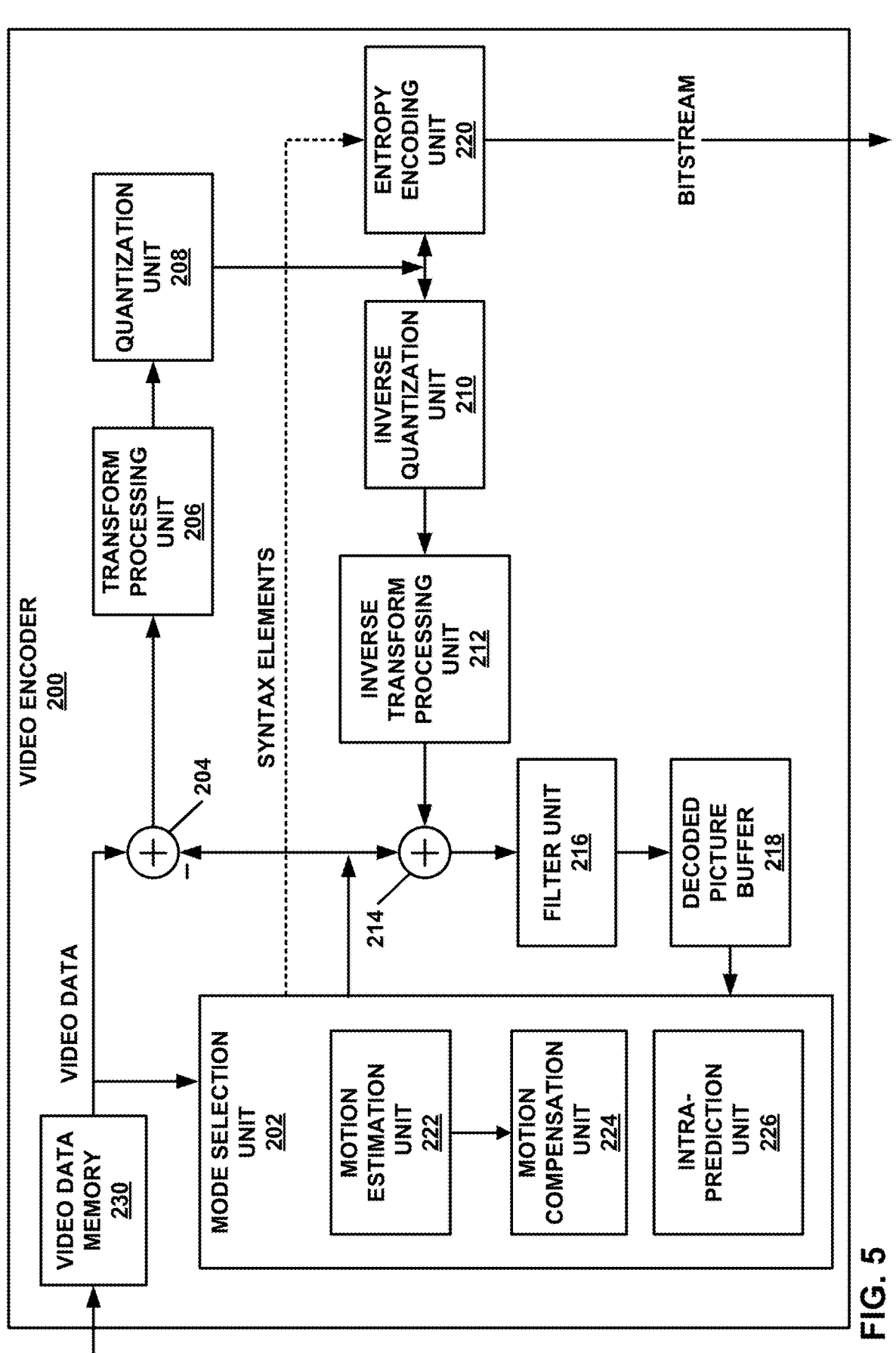
FIG. 5 is a block diagram illustrating an example video encoder that may perform the techniques of this disclosure.

FIG. 5 is a block diagram illustrating an example video encoder 200 that may perform the techniques of this disclosure. FIG. 5 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 5, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 5 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure.

superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine that a block of a current picture of video data is encoded using an intra block copy mode; determine a block vector for the block; locate a prediction block for the block in the current picture using the block vector; and encode the block based on the prediction block.

Figure 6:
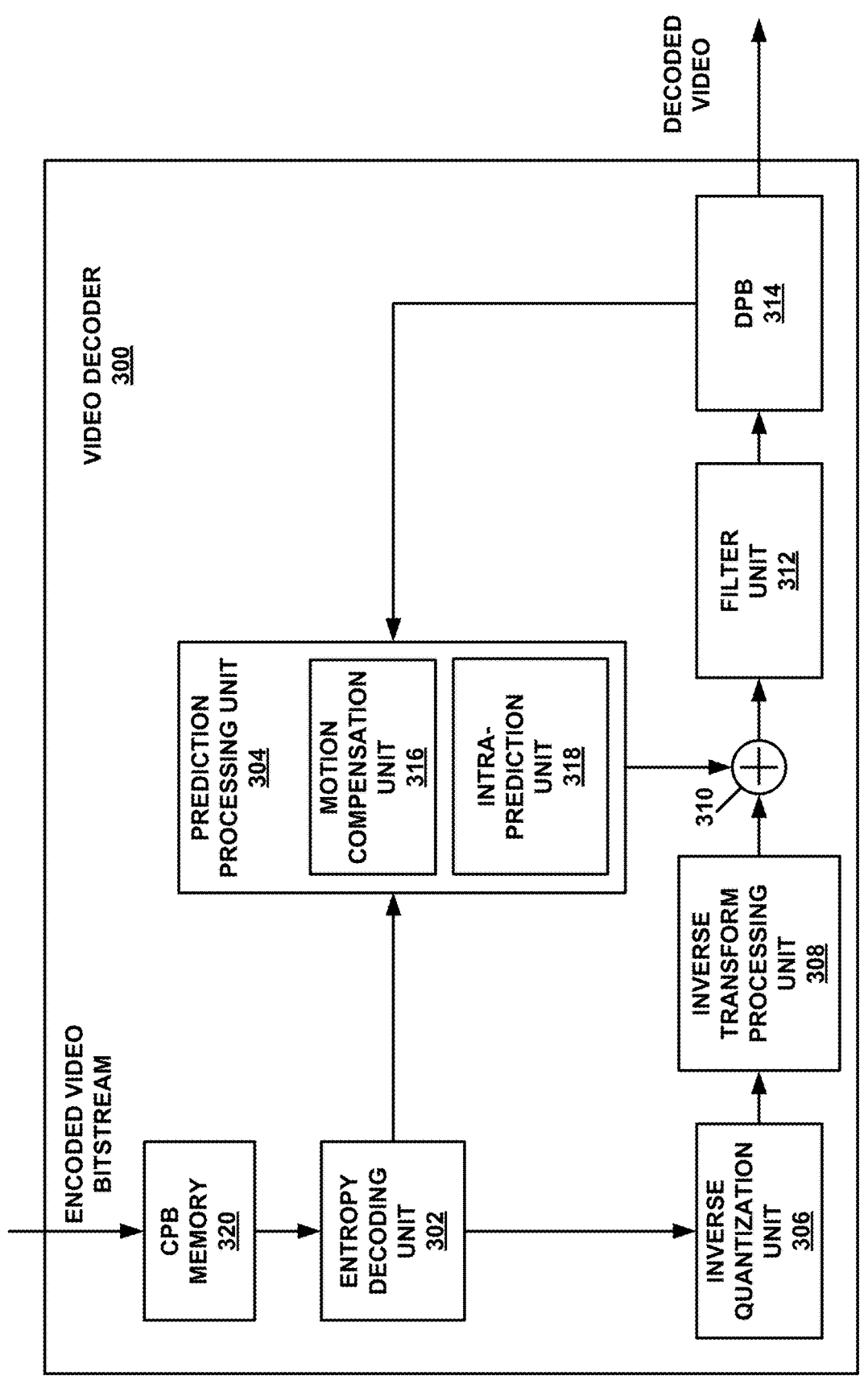
FIG. 6 is a block diagram illustrating an example video decoder that may perform the techniques of this disclosure.

FIG. 6 is a block diagram illustrating an example video decoder 300 that may perform the techniques of this disclosure. FIG. 6 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 6, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream.

CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 6 are illustrated to assist with understanding the operations performed by video decoder 300. The units may be implemented as fixed-function circuits, programmable circuits, or a combination thereof. Similar to FIG. 5, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 5).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 5). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine that a block of a current picture of video data is encoded using an intra block copy mode; determine a block vector for the block; locate a prediction block for the block in the current picture using the block vector; and decode the block based on the prediction block.

Figure 7:
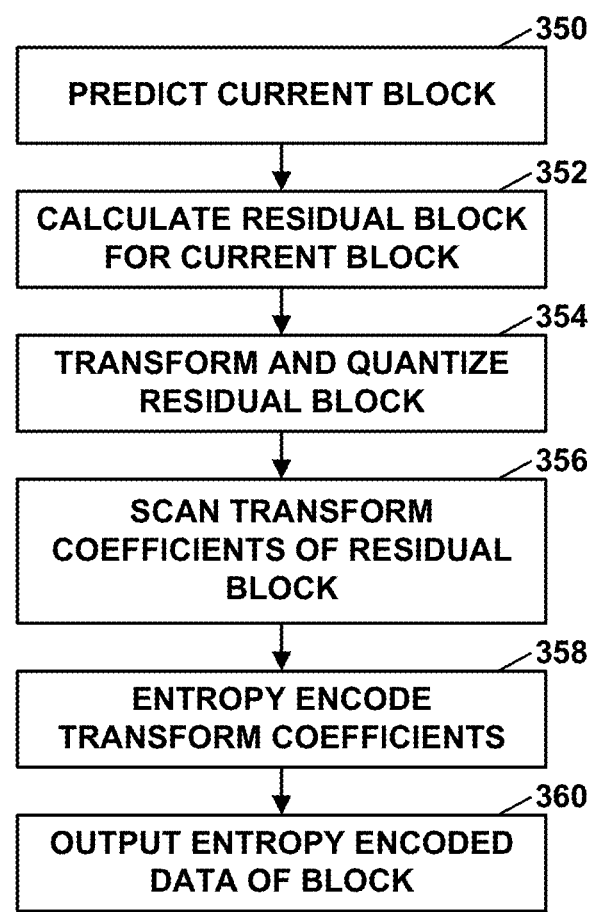
FIG. 7 is a flowchart illustrating an example process for encoding a current block in accordance with the techniques of this disclosure.

FIG. 7 is a flowchart illustrating an example process for encoding a current block in accordance with the techniques of this disclosure. The current block may be or include a current CU. Although described with respect to video encoder 200 (FIGS. 1 and 5), it should be understood that other devices may be configured to perform a process similar to that of FIG. 7.

In this example, video encoder 200 initially predicts the current block (350). For example, video encoder 200 may form a prediction block for the current block using IBC. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

FIG. 8 is a flowchart illustrating an example process for decoding a current block of video data in accordance with the techniques of this disclosure. The current block may be or include a current CU. Although described with respect to video decoder 300 (FIGS. 1 and 6), it should be understood that other devices may be configured to perform a process similar to that of FIG. 8.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an IBC, intra-, or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

FIG. 9 is a flowchart illustrating an example process for decoding a current block of video data in accordance with the techniques of this disclosure. The current block may be or include a current CU. Although described with respect to video decoder 300 (FIGS. 1 and 6), it should be understood that other devices may be configured to perform a process similar to that of FIG. 9.

Video decoder 300 receives a first syntax element in a syntax structure, a first value for the first syntax element indicating that an IBC mode is enabled for slices corresponding to the syntax structure and a second value for the first syntax element indicating that the IBC mode is disabled for the slices corresponding to the syntax structure (400).

In response to the first syntax element being set to the first value for the first syntax element, video decoder 300 receives a second syntax element in the syntax structure, a first value for the second syntax element indicating that the IBC mode is enabled for non-intra slices corresponding to the syntax structure and a second value for the second syntax element indicating that the IBC mode is disabled for non-intra slices corresponding to the syntax structure (402).

In response to the second syntax element being set to the first value for the second syntax element and in response to a slice type for a block of video data being a non-intra slice, video decoder 300 receives a third syntax element for the block of video data, a first value for the third syntax element indicating that the IBC mode is enabled for the block of video data and a second value for the third syntax element indicating that the IBC mode is disabled for the block of video data (404).

In response to the first syntax element being set to the first value for the first syntax element, video decoder 300 may receive one or more additional syntax elements. In some examples, a first value for the additional syntax element may indicate that a reconstruction reordered intra block copy mode is enabled for the slices corresponding to the syntax structure, and a second value for the second syntax element may indicate that the reconstruction reordered intra block copy mode is disabled for non-intra slices corresponding to the syntax structure. In some examples, a first value for the additional syntax element may indicate that an intra block copy with template matching mode is enabled for the slices corresponding to the syntax structure, and a second value for the second syntax element may indicate that the intra block copy with template matching mode is disabled for the slices corresponding to the syntax structure. In some examples, a first value for the additional syntax element may indicate that intra block copy merge tools are enabled for one or more blocks of the slices corresponding to the syntax structure, and a second value for the second syntax element may indicate that the intra block copy merge tools are disabled for the one or more blocks of the slices corresponding to the syntax structure.

In response to the third syntax element being set to the first value for the third syntax element, video decoder 300 decodes the block of video data using the IBC mode (406). To decode the block of video data using the intra block copy mode, video decoder 300 may determine a block vector for the block, locate a prediction block for the block in a same picture as the block using the block vector, and decode the block based on the prediction block. To determine the block vector for the block, video decoder 300 may generate a list of candidate block vectors, receive an index value, select a candidate block vector from the list of candidates, and determine the block vector based on the selected candidate. The selected candidate may, for example, be a block vector predictor for determining the block vector or may be the block vector itself.

Video decoder 300 outputs a decoded picture of video data comprising the decoded block of video data (408). Video decoder 300 may, for example, output the decoded picture for display or output the decoded picture for storage or transmission.

The following numbered clauses illustrate one or more aspects of the devices and techniques described in this disclosure.

Clause 1A: A method of decoding video data, the method comprising: determining that a block of a current picture of video data is encoded using an intra block copy mode; determining a block vector for the block; locating a prediction block for the block in the current picture using the block vector; and decoding the block based on the prediction block.

Clause 2A: The method of clause 1A, wherein the current picture comprises natural video content.

Clause 3A: The method of clause 1A or 2A, wherein determining that the block of the current picture of video data is encoded using the intra block copy mode comprises receiving, in a syntax structure, a first flag indicating that IBC is enabled for blocks belonging to the syntax structure.

Clause 4A: The method of any of clauses 1A-3A, wherein determining that the block of the current picture of video data is encoded using the intra block copy mode comprises receiving, in the syntax structure, a second flag.

Clause 5A: The method of clause 1A or 2A, further comprising: receiving a first flag indicating that IBC merge tools are enabled for blocks belonging to the syntax structure.

Clause 6A: The method of any of clauses 1A, 2A, or 5,A further comprising: receiving, for the block, a second flag indicating whether the IBC merge tools are enabled for the block.

Clause 7A: The method of any of clauses 1A-4A, further comprising: determining based on a size or shape of the block whether merge tools are enabled for the block.

Clause 8A: A device for decoding video data, the device comprising one or more means for performing the method of any of clauses 1A-7A.

Clause 9A: The device of clause 8A, wherein the one or more means comprise one or more processors implemented in circuitry.

Clause 10A: The device of any of clauses 8A and 9A, further comprising a memory to store the video data. Clause 11A: The device of any of clauses 8A-10A, further comprising a display configured to display decoded video data.

Clause 12A: The device of any of clauses 8A-11A, wherein the device comprises one or more of a camera, a computer, a mobile device, a broadcast receiver device, or a set-top box.

Clause 13A: The device of any of clauses 8A-12A, wherein the device comprises a video decoder.

Clause 14A: The device of any of clauses 8A-13A, wherein the device comprises a video encoder.

Clause 15A: A computer-readable storage medium having stored thereon instructions that, when executed, cause one or more processors to perform the method of any of clauses 1A-7A.

Clause 1B: A method of decoding video data, the method comprising: receiving a first syntax element in a syntax structure, wherein a first value for the first syntax element indicates that an intra block copy mode is enabled for slices corresponding to the syntax structure and a second value for the first syntax element indicates that the intra block copy mode is disabled for the slices corresponding to the syntax structure; in response to the first syntax element being set to the first value for the first syntax element, receiving a second syntax element in the syntax structure, wherein a first value for the second syntax element indicates that the intra block copy mode is enabled for non-intra slices corresponding to the syntax structure and a second value for the second syntax element indicates that the intra block copy mode is disabled for non-intra slices corresponding to the syntax structure; in response to the second syntax element being set to the first value for the second syntax element and in response to a slice type for a block of video data being a non-intra slice, receiving a third syntax element for the block of video data, wherein a first value for the third syntax element indicates that the intra block copy mode is enabled for the block of video data and a second value for the third syntax element indicates that the intra block copy mode is disabled for the block of video data; in response to the third syntax element being set to the first value for the third syntax element, decoding the block of video data using the intra block copy mode; outputting a decoded picture of video data comprising the decoded block of video data.

Clause 2B: The method of clause 1B, further comprising: in response to the first syntax element being set to the first value for the first syntax element, receiving a fourth syntax element in the syntax structure, wherein a first value for the fourth syntax element indicates that a reconstruction reordered intra block copy mode is enabled for the slices corresponding to the syntax structure and a second value for the second syntax element indicates that the reconstruction reordered intra block copy mode is disabled for non-intra slices corresponding to the syntax structure.

Clause 3B: The method of clause 1B, further comprising: in response to the first syntax element being set to the first value for the first syntax element, receiving a fourth syntax element in the syntax structure, wherein a first value for the fourth syntax element indicates that an intra block copy with template matching mode is enabled for the slices corresponding to the syntax structure and a second value for the second syntax element indicates that the intra block copy with template matching mode is disabled for the slices corresponding to the syntax structure.

Clause 4B: The method of clause 1B, further comprising: in response to the first syntax element being set to the first value for the first syntax element, receiving a fourth syntax element, wherein a first value for the fourth syntax element indicates that intra block copy merge tools are enabled for one or more blocks of the slices corresponding to the syntax structure and a second value for the second syntax element indicates that the intra block copy merge tools are disabled for the one or more blocks of the slices corresponding to the syntax structure.

Clause 5B: The method of any of clauses 1B-4B, wherein decoding the block of video data using the intra block copy mode comprises: determining a block vector for the block; locating a prediction block for the block, in a same picture as the block, using the block vector; and decoding the block based on the prediction block.

Clause 6B: The method of clause 5B, wherein determining the block vector for the block comprises: generating a list of candidate block vectors; receiving an index value; selecting a candidate block vector from the list of candidates; and determining the block vector based on the selected candidate.

Clause 7B: The method of clause 6B, wherein the selected candidate comprise a block vector predictor and determining the block vector based on the selected candidate comprises adding a block vector difference to the block vector predictor.

Clause 8B: The method of clause 6B, wherein the selected candidate comprises the block vector.

Clause 9B: The method of any of clauses 1B-8B, wherein the decoded block of video data comprises screen content video.

Clause 10B: The method of any of clauses 1B-9B, further comprising: in response to a second instance of the second syntax element being set to the second value for the second syntax element and in response to a slice type for a second block of video data being an intra slice, receiving a second instance of the third syntax element for the second block of video data; in response to the third syntax element being set to the second value for the third syntax element, decoding the second block of video data using the intra block copy mode; outputting a second decoded picture of video data comprising the second decoded block of video data.

Clause 11B: The method of clause 10B, wherein the second decoded block of video data comprises natural video content.

Clause 12B: A device for decoding video data, the device comprising: a memory configured to store video data; one or more processors implemented in circuitry and configured to: receive a first syntax element in a syntax structure, wherein a first value for the first syntax element indicates that an intra block copy mode is enabled for slices corresponding to the syntax structure and a second value for the first syntax element indicates that the intra block copy mode is disabled for the slices corresponding to the syntax structure; in response to the first syntax element being set to the first value for the first syntax element, receive a second syntax element in the syntax structure, wherein a first value for the second syntax element indicates that the intra block copy mode is enabled for non-intra slices corresponding to the syntax structure and a second value for the second syntax element indicates that the intra block copy mode is disabled for non-intra slices corresponding to the syntax structure; in response to the second syntax element being set to the first value for the second syntax element and in response to a slice type for a block of video data being a non-intra slice, receive a third syntax element for the block of video data, wherein a first value for the third syntax element indicates that the intra block copy mode is enabled for the block of video data and a second value for the third syntax element indicates that the intra block copy mode is disabled for the block of video data; in response to the third syntax element being set to the first value for the third syntax element, decode the block of video data using the intra block copy mode; output a decoded picture of video data comprising the decoded block of video data.

Clause 13B: The device of clause 12B, wherein the one or more processors are further configured to: in response to the first syntax element being set to the first value for the first syntax element, receive a fourth syntax element in the syntax structure, wherein a first value for the fourth syntax element indicates that a reconstruction reordered intra block copy mode is enabled for the slices corresponding to the syntax structure and a second value for the second syntax element indicates that the reconstruction reordered intra block copy mode is disabled for non-intra slices corresponding to the syntax structure.

Clause 14B: The device of clause 12B, wherein the one or more processors are further configured to: in response to the first syntax element being set to the first value for the first syntax element, receive a fourth syntax element in the syntax structure, wherein a first value for the fourth syntax element indicates that an intra block copy with template matching mode is enabled for the slices corresponding to the syntax structure and a second value for the second syntax element indicates that the intra block copy with template matching mode is disabled for the slices corresponding to the syntax structure.

Clause 15B: The device of clause 12B, wherein the one or more processors are further configured to: in response to the first syntax element being set to the first value for the first syntax element, receive a fourth syntax element, wherein a first value for the fourth syntax element indicates that intra block copy merge tools are enabled for one or more blocks of the slices corresponding to the syntax structure and a second value for the second syntax element indicates that the intra block copy merge tools are disabled for the one or more blocks of the slices corresponding to the syntax structure.

Clause 16B: The device of any of clauses 12B-15B, wherein to decode the block of video data using the intra block copy mode, wherein the one or more processors are further configured to: determine a block vector for the block; locate a prediction block for the block, in a same picture as the block, using the block vector; and decode the block based on the prediction block.

Clause 17B: The device of clause 16B, wherein to determine the block vector for the block, the one or more processors are further configured to: generate a list of candidate block vectors; receive an index value; select a candidate block vector from the list of candidates; and determine the block vector based on the selected candidate.

Clause 18B: The device of clause 17B, wherein the selected candidate comprise a block vector predictor and wherein to determine the block vector based on the selected candidate, the one or more processors are further configured to add a block vector difference to the block vector predictor.

Clause 19B: The device of clause 17B, wherein the selected candidate comprises the block vector.

Clause 20B: The device of any of clauses 12B-19B, wherein the decoded block of video data comprises screen content video.

Clause 21B: The device of any of clauses 12B-20B, wherein the one or more processors are further configured to: in response to a second instance of the second syntax element being set to the second value for the second syntax element and in response to a slice type for a second block of video data being an intra slice, receive a second instance of the third syntax element for the second block of video data; in response to the third syntax element being set to the second value for the third syntax element, decode the second block of video data using the intra block copy mode; output a second decoded picture of video data comprising the second decoded block of video data.

Clause 22B: The device of clause 21B, wherein the second decoded block of video data comprises natural video content.

Clause 23B: The device of any of clauses 12B-22B, further comprising: a display configured to display the decoded picture of video data.

Clause 24B: The device of any of clauses 12B-23B, wherein the device comprises one or more of a camera, a computer, a mobile device, a broadcast receiver device, or a set-top box.

Clause 25B: A computer-readable storage medium storing instructions that when executed by one or more processors cause the one or more processors to: receive a first syntax element in a syntax structure, wherein a first value for the first syntax element indicates that an intra block copy mode is enabled for slices corresponding to the syntax structure and a second value for the first syntax element indicates that the intra block copy mode is disabled for the slices corresponding to the syntax structure; in response to the first syntax element being set to the first value for the first syntax element, receive a second syntax element in the syntax structure, wherein a first value for the second syntax element indicates that the intra block copy mode is enabled for non-intra slices corresponding to the syntax structure and a second value for the second syntax element indicates that the intra block copy mode is disabled for non-intra slices corresponding to the syntax structure; in response to the second syntax element being set to the first value for the second syntax element and in response to a slice type for a block of video data being a non-intra slice, receive a third syntax element for the block of video data, wherein a first value for the third syntax element indicates that the intra block copy mode is enabled for the block of video data and a second value for the third syntax element indicates that the intra block copy mode is disabled for the block of video data; in response to the third syntax element being set to the first value for the third syntax element, decode the block of video data using the intra block copy mode; output a decoded picture of video data comprising the decoded block of video data.

Clause 26B: A method of encoding video data, the method comprising: including a first syntax element set to a first value for the first syntax element in a syntax structure of the video data, wherein the first value for the first syntax element indicates that an intra block copy mode is enabled for slices corresponding to the syntax structure and a second value for the first syntax element indicates that the intra block copy mode is disabled for the slices corresponding to the syntax structure; in response to the first syntax element being set to the first value for the first syntax element, including a second syntax element set to a first value for the second syntax element in the syntax structure, wherein the first value for the second syntax element indicates that the intra block copy mode is enabled for non-intra slices corresponding to the syntax structure and a second value for the second syntax element indicates that the intra block copy mode is disabled for non-intra slices corresponding to the syntax structure; in response to the second syntax element being set to the first value for the second syntax element and in response to a slice type for a block of video data being a non-intra slice, setting a third syntax element for the block of video data to first value for the third syntax element, wherein the first value for the third syntax element indicates that the intra block copy mode is enabled for the block of video data and a second value for the third syntax element indicates that the intra block copy mode is disabled for the block of video data; and outputting a bitstream of encoded video data comprising the first syntax element, the second syntax element, and third syntax element.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

receiving a first syntax element in a syntax structure, wherein a first value for the first syntax element indicates that an intra block copy mode is enabled for slices corresponding to the syntax structure and a second value for the first syntax element indicates that the intra block copy mode is disabled for the slices corresponding to the syntax structure;

in response to the first syntax element being set to the first value for the first syntax element, receiving a second syntax element in the syntax structure, wherein a first value for the second syntax element indicates that the intra block copy mode is enabled for non-intra slices corresponding to the syntax structure and a second value for the second syntax element indicates that the intra block copy mode is disabled for non-intra slices corresponding to the syntax structure;

in response to the second syntax element being set to the first value for the second syntax element and in response to a slice type for a block of video data being a non-intra slice, receiving a third syntax element for the block of video data, wherein a first value for the third syntax element indicates that the intra block copy mode is enabled for the block of video data and a second value for the third syntax element indicates that the intra block copy mode is disabled for the block of video data;

in response to the third syntax element being set to the first value for the third syntax element, decoding the block of video data using the intra block copy mode;

outputting a decoded picture of video data comprising the decoded block of video data;

in response to a second instance of the second syntax element being set to the second value for the second syntax element and in response to a slice type for a second block of video data being an intra slice, receiving a second instance of the third syntax element for the second block of video data;

in response to the second instance of the third syntax element being set to the second value, decoding the second block of video data using the intra block copy mode; and outputting a second decoded picture of video data comprising the second decoded block of video data.

2. The method of claim 1, further comprising:

in response to the first syntax element being set to the first value for the first syntax element, receiving a fourth syntax element in the syntax structure, wherein a first value for the fourth syntax element indicates that a reconstruction reordered intra block copy mode is enabled for the slices corresponding to the syntax structure and a second value for the second syntax element indicates that the reconstruction reordered intra block copy mode is disabled for non-intra slices corresponding to the syntax structure.

3. The method of claim 1, further comprising:

in response to the first syntax element being set to the first value for the first syntax element, receiving a fourth syntax element in the syntax structure, wherein a first value for the fourth syntax element indicates that an intra block copy with template matching mode is enabled for the slices corresponding to the syntax structure and a second value for the second syntax element indicates that the intra block copy with template matching mode is disabled for the slices corresponding to the syntax structure.

4. The method of claim 1, further comprising:

in response to the first syntax element being set to the first value for the first syntax element, receiving a fourth syntax element, wherein a first value for the fourth syntax element indicates that intra block copy merge tools are enabled for one or more blocks of the slices corresponding to the syntax structure and a second value for the second syntax element indicates that the intra block copy merge tools are disabled for the one or more blocks of the slices corresponding to the syntax structure.

5. The method of claim 1, wherein decoding the block of video data using the intra block copy mode comprises:

determining a block vector for the block;

locating a prediction block for the block, in a same picture as the block, using the block vector; and decoding the block based on the prediction block.

6. The method of claim 5, wherein determining the block vector for the block comprises:

generating a list of candidate block vectors;

receiving an index value;

selecting a candidate block vector from the list of candidates; and determining the block vector based on the selected candidate.

7. The method of claim 6, wherein the selected candidate comprise a block vector predictor and determining the block vector based on the selected candidate comprises adding a block vector difference to the block vector predictor.

8. The method of claim 6, wherein the selected candidate comprises the block vector.

9. The method of claim 1, wherein the decoded block of video data comprises screen content video.

10. The method of claim 1, wherein the second decoded block of video data comprises natural video content.

11. A device for decoding video data, the device comprising:

a memory configured to store video data;

one or more processors implemented in circuitry and configured to:

receive a first syntax element in a syntax structure, wherein a first value for the first syntax element indicates that an intra block copy mode is enabled for slices corresponding to the syntax structure and a second value for the first syntax element indicates that the intra block copy mode is disabled for the slices corresponding to the syntax structure;

in response to the first syntax element being set to the first value for the first syntax element, receive a second syntax element in the syntax structure, wherein a first value for the second syntax element indicates that the intra block copy mode is enabled for non-intra slices corresponding to the syntax structure and a second value for the second syntax element indicates that the intra block copy mode is disabled for non-intra slices corresponding to the syntax structure;

in response to the second syntax element being set to the first value for the second syntax element and in response to a slice type for a block of video data being a non-intra slice, receive a third syntax element for the block of video data, wherein a first value for the third syntax element indicates that the intra block copy mode is enabled for the block of video data and a second value for the third syntax element indicates that the intra block copy mode is disabled for the block of video data;

in response to the third syntax element being set to the first value for the third syntax element, decode the block of video data using the intra block copy mode;

output a decoded picture of video data comprising the decoded block of video data in response to a second instance of the second syntax element being set to the second value for the second syntax element and in response to a slice type for a second block of video data being an intra slice, receive a second instance of the third syntax element for the second block of video data;

in response to the second instance of the third syntax element being set to the second value, decode the second block of video data using the intra block copy mode; and output a second decoded picture of video data comprising the second decoded block of video data.

12. The device of claim 11, wherein the one or more processors are further configured to:

in response to the first syntax element being set to the first value for the first syntax element, receive a fourth syntax element in the syntax structure, wherein a first value for the fourth syntax element indicates that a reconstruction reordered intra block copy mode is enabled for the slices corresponding to the syntax structure and a second value for the second syntax element indicates that the reconstruction reordered intra block copy mode is disabled for non-intra slices corresponding to the syntax structure.

13. The device of claim 11, wherein the one or more processors are further configured to:

in response to the first syntax element being set to the first value for the first syntax element, receive a fourth syntax element in the syntax structure, wherein a first value for the fourth syntax element indicates that an intra block copy with template matching mode is enabled for the slices corresponding to the syntax structure and a second value for the second syntax element indicates that the intra block copy with template matching mode is disabled for the slices corresponding to the syntax structure.

14. The device of claim 11, wherein the one or more processors are further configured to:

in response to the first syntax element being set to the first value for the first syntax element, receive a fourth syntax element, wherein a first value for the fourth syntax element indicates that intra block copy merge tools are enabled for one or more blocks of the slices corresponding to the syntax structure and a second value for the second syntax element indicates that the intra block copy merge tools are disabled for the one or more blocks of the slices corresponding to the syntax structure.

15. The device of claim 11, wherein to decode the block of video data using the intra block copy mode, wherein the one or more processors are further configured to:

determine a block vector for the block;

locate a prediction block for the block, in a same picture as the block, using the block vector; and decode the block based on the prediction block.

16. The device of claim 15, wherein to determine the block vector for the block, the one or more processors are further configured to:

generate a list of candidate block vectors;

receive an index value;

select a candidate block vector from the list of candidates; and determine the block vector based on the selected candidate.

17. The device of claim 16, wherein the selected candidate comprise a block vector predictor and wherein to determine the block vector based on the selected candidate, the one or more processors are further configured to add a block vector difference to the block vector predictor.

18. The device of claim 16, wherein the selected candidate comprises the block vector.

19. The device of claim 11, wherein the decoded block of video data comprises screen content video.

20. The device of claim 11, wherein the second decoded block of video data comprises natural video content.

21. The device of claim 11, further comprising:

a display configured to display the decoded picture of video data.

22. The device of claim 11, wherein the device comprises one or more of a camera, a computer, a mobile device, a broadcast receiver device, or a set-top box.

23. A computer-readable storage medium storing instructions that when executed by one or more processors cause the one or more processors to:

receive a first syntax element in a syntax structure, wherein a first value for the first syntax element indicates that an intra block copy mode is enabled for slices corresponding to the syntax structure and a second value for the first syntax element indicates that the intra block copy mode is disabled for the slices corresponding to the syntax structure;

in response to the first syntax element being set to the first value for the first syntax element, receive a second syntax element in the syntax structure, wherein a first value for the second syntax element indicates that the intra block copy mode is enabled for non-intra slices corresponding to the syntax structure and a second value for the second syntax element indicates that the intra block copy mode is disabled for non-intra slices corresponding to the syntax structure; in response to the second syntax element being set to the first value for the second syntax element and in response to a slice type for a block of video data being a non-intra slice, receive a third syntax element for the block of video data, wherein a first value for the third syntax element indicates that the intra block copy mode is enabled for the block of video data and a second value for the third syntax element indicates that the intra block copy mode is disabled for the block of video data;

in response to the third syntax element being set to the first value for the third syntax element, decode the block of video data using the intra block copy mode;

output a decoded picture of video data comprising the decoded block of video data in response to a second instance of the second syntax element being set to the second value for the second syntax element and in response to a slice type for a second block of video data being an intra slice, receive a second instance of the third syntax element for the second block of video data;

in response to the second instance of the third syntax element being set to the second value, decode the second block of video data using the intra block copy mode; and output a second decoded picture of video data comprising the second decoded block of video data.

* * * * *